U S011330126B2

(12) United States Patent
Hino (10) Patent No.: US 11,330,126 B2
(45) Date of Patent: May 10, 2022

(54) IMAGE READING DEVICE THAT READS AN IMAGE OF A DOCUMENT

(71) Applicant: CANON KABUSHIKI KAISHA, Tokyo (JP)

(72) Inventor: Takeshi Hino, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/165,405

(22) Filed: Feb. 2, 2021

(65) Prior Publication Data

US 2021/0243319 A1 Aug. 5, 2021

(30) Foreign Application Priority Data

Feb. 5, 2020 (JP) .............................. JP2020-018276

(51) Int. Cl.
*H04N 1/04* (2006.01)
*H04N 1/00* (2006.01)

(52) U.S. Cl.
CPC ....... *H04N 1/00602* (2013.01); *H04N 1/0071* (2013.01); *H04N 1/00652* (2013.01); *H04N 1/00689* (2013.01); *H04N 1/00694* (2013.01)

(58) Field of Classification Search
CPC ......... H04N 1/00602; H04N 1/090652; H04N 1/00689; H04N 1/00694; H04N 1/0071
USPC ................................................ 358/498, 496
See application file for complete search history.

(56) References Cited

U.S. PATENT DOCUMENTS

2021/0218856 A1* 7/2021 Okawa ............... H04N 1/00687

FOREIGN PATENT DOCUMENTS

JP 2013074431 A 4/2013

* cited by examiner

*Primary Examiner* — Cheukfan Lee
(74) *Attorney, Agent, or Firm* — Canon U.S.A., Inc. I.P. Division

(57) ABSTRACT

An image reading device includes a tray having a document, first and second rollers, a reading unit to read a document image of the conveyed document at a reading position, and a controller to selectively execute first and second controls. In the first control, the controller changes a drive speed of the first and second rollers from a first to a second speed faster than the first speed after the document reaches the first roller and before the document passes through the reading position, and changes the first and second rollers drive speed from the second to the first speed after the document reaches the second roller and before the image is completely read. In the second control, the controller maintains the first and second rollers drive speed in a section from a position where the document reaches the first roller to a position where the image reading completes.

7 Claims, 4 Drawing Sheets

IMAGE READING DEVICE THAT READS AN IMAGE OF A DOCUMENT

BACKGROUND

Field

The present disclosure relates to an image reading device that reads an image of a document.

Description of the Related Art

Conventionally, as a scanner placed on a copying machine or the like, a scanner including an automatic document feeder (ADF) that conveys a plurality of documents placed on a document tray, one at a time, is widely used. The ADF conveys the document with a plurality of conveyance rollers and reads an image on the document by causing the document to pass an image reading unit provided in the middle of a conveyance path.

The ADF may change drive control of the conveyance rollers according to the size and grammage of each document in order to keep the conveyance speed of the documents constant. This is because conveyance resistance of the document changes depending on the size and grammage of the document, so that there may be a discrepancy between a drive speed of the conveyance roller and a conveyance speed of the document. In general, with larger size and increased grammage, the conveyance resistance of a document becomes greater. In this case, a document conveyance speed deviates toward a lower speed with respect to the drive speed of the conveyance roller, and an image read in this state has a larger magnification in a conveyance direction than the actual document image.

Japanese Patent Application Laid-Open No. 2013-74431 discusses a method of executing control to increase or decrease the drive speed of a conveyance roller according to the document size and grammage, rather than the target document conveyance speed, in order to keep the document conveyance speed constant regardless of the document size and grammage.

An image reading device described in Japanese Patent Application Laid-Open No. 2013-74431 increases the drive speed of the conveyance roller for a document having a large grammage.

However, although a card-shaped document such as a business card generally has a large grammage, it has an exceptionally small conveyance resistance due to the size of the document, particularly, the short size in a widthwise direction, which is orthogonal to the conveyance direction (main scanning direction). Therefore, in conveyance control in which the drive speed of the conveyance roller with respect to the document size and the grammage is simply increased, a card-shaped document, such as a business card, may be unnecessarily accelerated and the magnification in the conveyance direction of a read image may be reduced.

SUMMARY

The present disclosure suppresses reduction in magnification in a conveyance direction when conveying a document that is short in a widthwise direction of the document.

According to an aspect of the present disclosure, an image reading device including an original document tray on which an original document is to be placed, a plurality of conveyance rollers configured to convey the original document in a conveyance direction, an image reading unit configured to read an image of the conveyed original document at a reading position, and a controller configured to selectively execute first conveyance control and second conveyance control based on a width of the original document, which is a length of the original document in a direction orthogonal to the conveyance direction, wherein the plurality of conveyance rollers includes a first conveyance roller arranged upstream of the reading position in the conveyance direction, and a second conveyance roller arranged downstream of the reading position in the conveyance direction, wherein, in the first conveyance control, the controller is configured to change a drive speed of the first and second conveyance rollers from a first speed to a second speed that is faster than the first speed after the original document reaches the first conveyance roller and before the original document passes through the reading position, and to change the drive speed of the first and second conveyance rollers from the second speed to the first speed after the original document reaches the second conveyance roller and before the reading of the image of the original document completes, and wherein, in the second conveyance control, the controller maintains the drive speed of the first and second conveyance rollers in a section from a position where the original document reaches the first conveyance roller to a position where the reading of the image of the original document completes.

Further features of the present disclosure will become apparent from the following description of exemplary embodiments with reference to the attached drawings.

DESCRIPTION OF THE EMBODIMENTS

[Configuration of Automatic Document Feeder]

Figure 1:
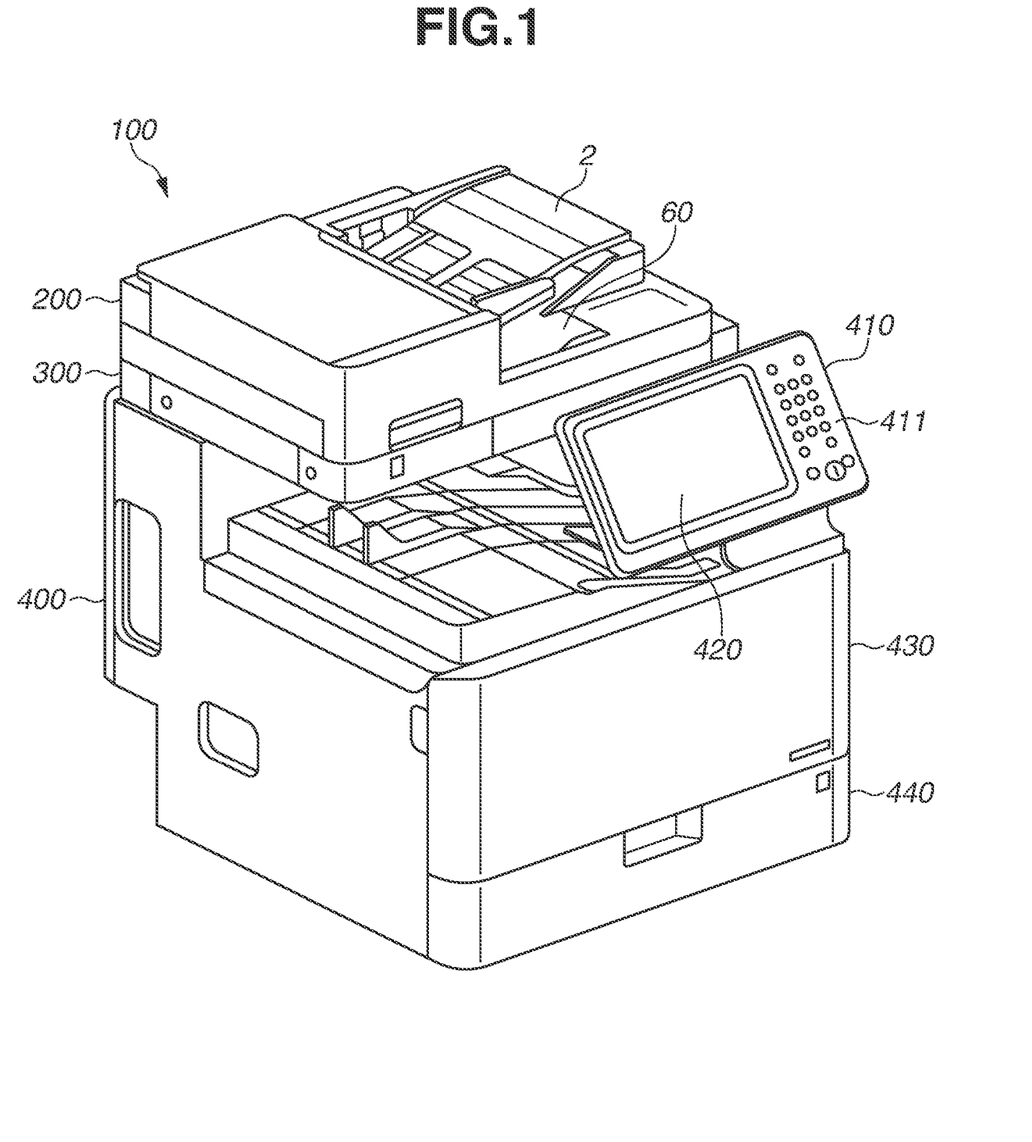
FIG. 1 illustrates an image forming apparatus equipped with a document conveying device.

Hereinafter, the present exemplary embodiment will be described. FIG. 1 is an overall perspective view illustrating an image reading device 100 according to the present exemplary embodiment. As illustrated in FIG. 1, the image reading device 100 includes an automatic document feeder (ADF) 200 that feeds a document and discharges the document to a paper discharge tray 60, and a reader 300 that reads an image of the document conveyed by the ADF 200.

A document conveyance operation of the ADF 200 will be described with reference to FIGS. 2A to 2C and FIGS. 3A to 3C. The ADF 200 includes a document tray 2 on which a document is placed. When a user places one or more documents on the document tray 2, a document detection sensor S1, which is an example of a first detection unit, and a document detection sensor S0, which is an example of a second detection unit, detect the document, and the ADF 200 becomes able to convey the document. A position of a leading edge of the document stack is regulated by a stopper 3 until the conveyance starts. When a start button provided on an operation panel 410 is pressed, a conveyance motor M is driven and the document conveyance operation starts. The conveyance motor M is a drive source that drives a paper feed roller 4, an upper separation roller 5, an extraction roller pair 7, a first conveyance roller pair 8, a second conveyance roller pair 9, and a paper discharge roller pair 10. In the present exemplary embodiment, a plurality of rollers, which are the paper feed roller 4, the upper separation roller 5, the extraction roller pair 7, the first conveyance roller pair 8, the second conveyance roller pair 9, and the paper discharge roller pair 10, are all driven by a same drive source (motor).

The image reading device 100 includes a control unit 1 having a central processing unit (CPU), a random access memory (RAM), a read only memory (ROM), and the like. A document detection sensor S1, a document detection sensor S0, a pull-out sensor S2, a first leading sensor S3, and a pre-paper discharge sensor S4 are connected to the control unit 1, and signals are input from these sensors. Further, the conveyance motor M is connected to the control unit 1, and the control unit 1 controls a drive transmission and a drive speed of the conveyance motor M.

A program for executing a process illustrated in a flowchart of FIG. 4, to be described below, is stored in the ROM of the control unit 1. The program stored in the ROM is read into the RAM in the control unit 1 and executed by the CPU.

Documents placed on the document tray 2 are sequentially fed out by the paper feed roller 4, from a top of the documents. The documents fed by the paper feed roller 4 are separated and fed one at a time by a separation roller pair including the upper separation roller 5 and a lower separation roller 6. The separated and fed documents are conveyed by each of the roller pairs: the extraction roller pair 7, the first conveyance roller pair 8, and the second conveyance roller pair 9. The document conveyed by these conveyance roller pairs passes through a gap between a flow reading glass plate 320 and a platen guide 40. At this time, an image is read by an image reading unit 350 at a reading position (a position where an image is read by the image reading unit 350) between the first conveyance roller pair 8 and the second conveyance roller pair 9. The document, from which the image has been read, is discharged onto the paper discharge tray 60 by the paper discharge roller pair 10.

[Configuration of Document Detector]

Figure 2A:
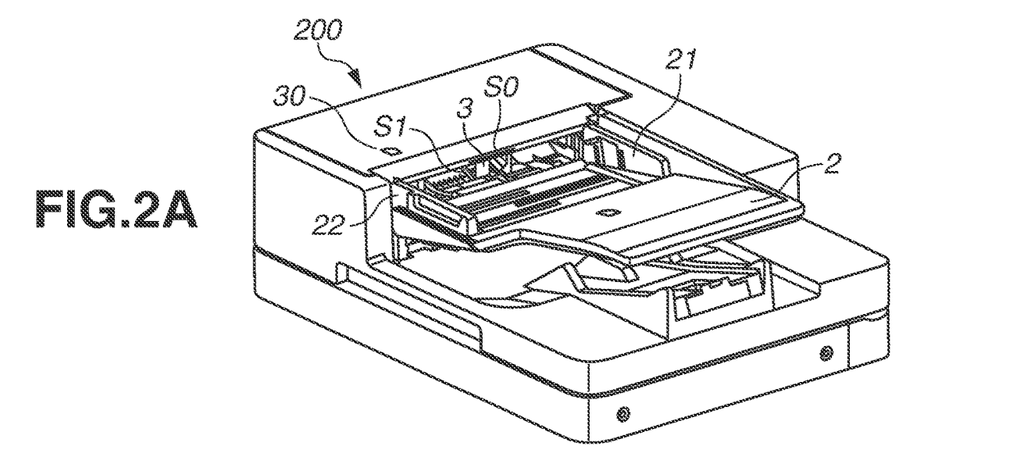
FIG. 2A is a perspective view of a sheet feeding section of the document conveyance device.
Figure 2B:
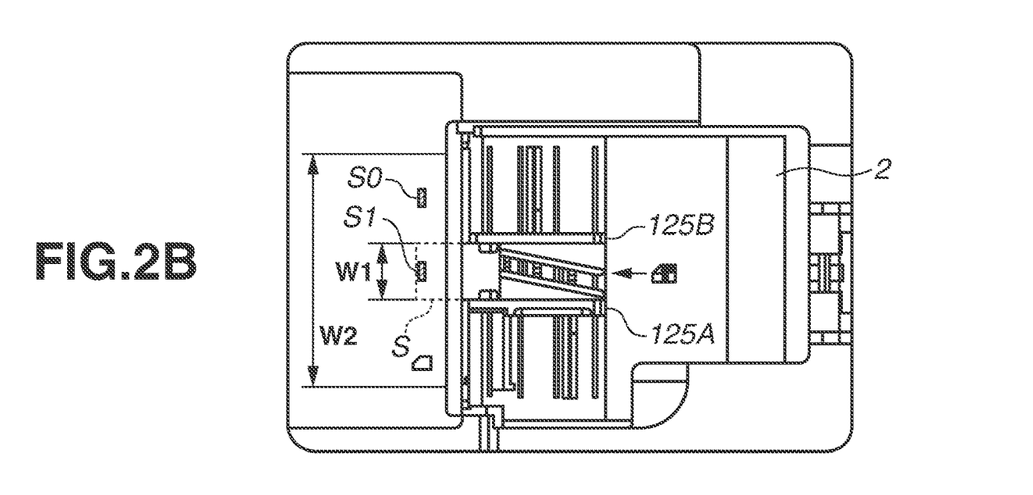
FIGS. 2B and 2C are top views thereof.

The document detection sensor S1 and the document detection sensor S0 will be described with reference to FIGS. 2A to 2C. The ADF 200 includes two document detection sensors S1 and S0 in the vicinity of a conveyance port, and detects the presence or absence of a document and a width of the document on the document tray 2 using these sensors. The document detection sensor S1 is an example of the first detection unit, and the document detection sensor S0 is an example of the second detection unit. A positional relationship between the document detection sensor S1 as the first detection unit and the document detection sensor S0 as the second detection unit will be described. FIG. 2B is a top view illustrating the ADF 200 in a state where a narrow document is placed. In the present exemplary embodiment, a narrow document means a sheet having a short width, such as a business card, and in the present exemplary embodiment, it means a document having a document width of less than 105 mm. For example, the size of a business card used in Japan is 55 mm×91 mm, and the size of a business card used in the United States is 51 mm×89 mm, 49 mm×85 mm, or the like. As illustrated in FIG. 2B, for example, a small-sized document S having a small width, such as a business card, is placed on the document tray 2 by a user, and both ends of the document S in a widthwise direction are brought into contact with side regulating plates 125A and 125B so that the position in the widthwise direction is regulated. Then, the document S is placed within a first area W1 in the widthwise direction. The document detection sensor S1 is arranged at a detection position at a center in the widthwise direction (a position closer to the center than the end portion in the widthwise direction). This means the document detection sensor S1 is arranged inside the first area W1. Therefore, when the document S is inserted and oriented toward a downstream side in a conveyance direction, and is set to be brought into contact with a regulating plate (not illustrated), the document detection sensor S1 detects the document S. As a result, the control unit 1 recognizes the presence of the document S and determines that the document is a narrow document.

Figure 2C:
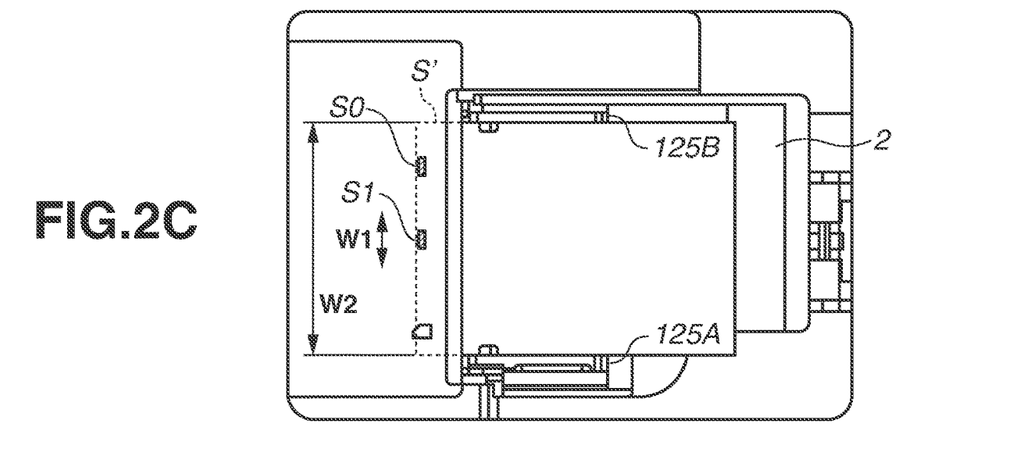

On the other hand, as illustrated in FIG. 2C, for example, a large-sized document S' having a large width, such as an A4 size, is placed on the document tray 2 by a user, and both ends of the document in the widthwise direction are brought into contact with the side regulating plates 125A and 125B so that the position in the widthwise direction is regulated. Then, the document S' is placed within a second area W2 in the widthwise direction. As described above, the document detection sensor S1 is arranged at a first detection position P1 that is a center portion (a central side) in the widthwise direction. Further, the document detection sensor S0 is arranged outside the first area W1, closer to an end portion side than to the center portion in the widthwise direction (a position closer to the end portion than the center portion in the widthwise direction). That is, the document detection sensor S0 is arranged outside the first area W1 and inside the second area W2. Therefore, when the document S' is inserted and oriented toward the downstream side in the conveyance direction and is set to be brought into contact with the regulating plate (not illustrated), both the document detection sensor S1 and the document detection sensor S0 output an ON signal to the control unit 1, and it is determined that the document S' is present.

As described above, the document detection sensor S1 is arranged substantially at the center of the document tray 2 in a main scanning direction (widthwise direction that is orthogonal to a document conveyance direction). On the other hand, the document detection sensor S0 is disposed at an interval of about 52.5 mm from the document sensor S1 in the main scanning direction. In the present exemplary embodiment, the document detection sensor S1 is arranged at a position toward a back side in relation to the document detection sensor S0 when the image reading device 100 is viewed from the front.

In a case where the document is placed and the document detection sensor S0 detects the document, the control unit 1 determines that the document has a wide document width (a document that is not narrow in width) and executes corresponding first conveyance control.

On the other hand, in a case where the document detection sensors S1 and S0 detect a document, or when only the document detection sensor S1 detects the document, the control unit 1 determines that the document has a narrow document width (narrow document), and executes corresponding second conveyance control. It is desirable that the position of the document detection sensor S1 is near the center of the conveyance port within a range where a document having an assumed maximum width (a document having a width of 105 mm in the present exemplary embodiment) in the application of the second conveyance control is not detected. In the present exemplary embodiment, the document detection sensor S1 is rotatably hung from an upper surface of the conveyance path, and the document detection sensor S0 is rotatably projected from a lower surface of the conveyance path. However, the present disclosure is not limited to this, and the sensor arrangement and the detection method are not limited as long as the configuration is such that the presence or absence of a document can be determined at a specified position.

[Fluctuation of Document Conveyance Speed]

Ideally, a drive speed of each conveyance roller and a conveyance speed of the document match. However, in reality, due to the balance between a conveyance resistance in the conveyance path and a conveyance force of the conveyance roller, these speeds may not match in all sections in the conveyance direction.

When a document spans from the extraction roller pair 7 to the second conveyance roller pair 9 (see FIG. 3B), the document conveyance speed during a reading process in the present exemplary embodiment fluctuates with the following tendency.

[(1) Case where Leading Edge of Document is Positioned Between First Conveyance Roller Pair 8 and Second Conveyance Roller Pair 9]

In a case where the leading edge of a document is positioned anywhere between the first conveyance roller pair 8 and the second conveyance roller pair 9, most of the document is positioned between the extraction roller pair 7 and the second conveyance roller pair 9 where the conveyance path is particularly bent. Moreover, this section passes through a narrow gap between the platen guide 40 and the flow reading glass plate 320. Therefore, the conveyance resistance is comparatively large. Moreover, since the document is not held between the roller pairs downstream of the first conveyance roller pair 8 in the conveyance direction (i.e., second conveyance roller pair 9 and paper discharge roller pair 10), the conveyance force received by the document from the conveyance roller pair is small. Therefore, in this area, the conveyance speed of the document is less than the drive speed of the conveyance roller pairs 8 and 9. This tendency becomes more obvious as the size and grammage of the document become larger.

[(2) Case where Leading Edge of Document is Positioned Between Second Conveyance Roller Pair 9 and Paper Discharge Roller Pair 10]

In this section, the document remains to span from the extraction roller pair 7 to the second conveyance roller pair 9 where the conveyance path is particularly bent. Alternatively, as for a document with a short size in the conveyance direction, a trailing edge of the document may pass through a bent portion, thereby mitigating bending of the document. On the other hand, since the document is held between the two conveyance roller pairs 8 and 9, which position immediately upstream and immediately downstream of the reading position of the image reading unit 350, respectively, the conveyance force around the reading position becomes greater than the conveyance force in the case of (1) described above. Therefore, the conveyance speed of the document is substantially equal to the drive speed of the first conveyance roller pair 8 and the second conveyance roller pair 9, so that a stable read image can be obtained.

[(3) after Leading Edge of Document Reaches Paper Discharge Roller Pair 10]

This section is an area where the document gradually passes through the bent portion of the conveyance path. Accordingly, the conveyance resistance gradually decreases. In addition to the conveyance force of the first conveyance roller pair 8 and the second conveyance roller pair 9, the conveyance force of the paper discharge roller pair 10 is also applied, so that the conveyance force is significantly greater than the conveyance force in the area (2). Therefore, the conveyance speed of the document is substantially equal to the drive speed of the conveyance roller.

[(4) after Trailing Edge of Document Passes First Conveyance Roller Pair 8]

The document passes through the bent portion of the conveyance path and a portion of the leading edge of the document is outside the conveyance path. Accordingly, the conveyance resistance is the smallest. On the other hand, since the rollers between which the document is held are the second conveyance roller pair 9 and the paper discharge roller pair 10, the conveyance force is slightly less than the conveyance force in the area (3). Overall, in this area, the conveyance speed of the document substantially matches the drive speed of the conveyance roller.

Figure 3A:
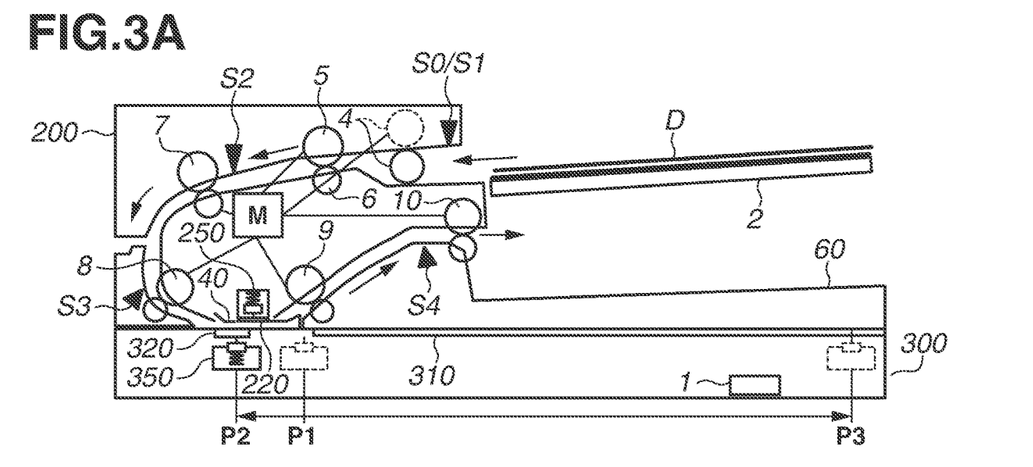
FIGS. 3A, 3B and 3C are cross-sectional views of the document conveyance device and an image reading device.
Figure 3B:
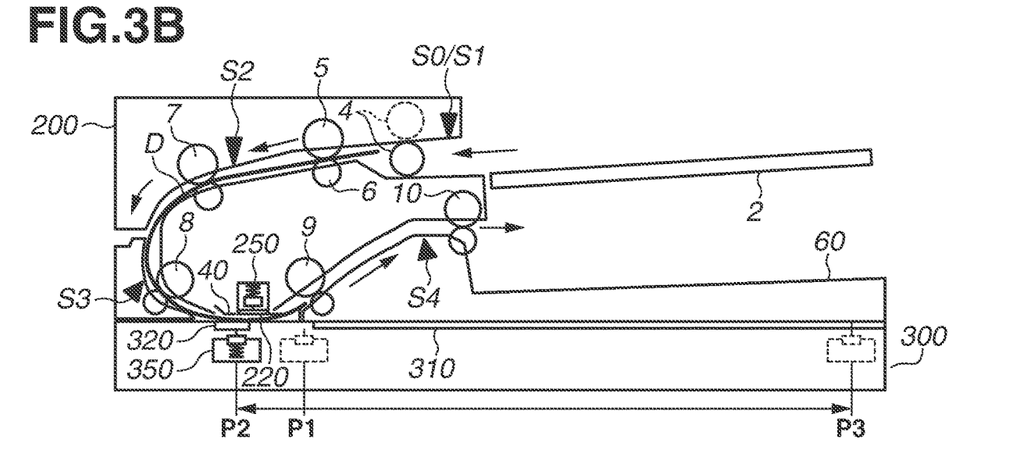
Figure 3C:
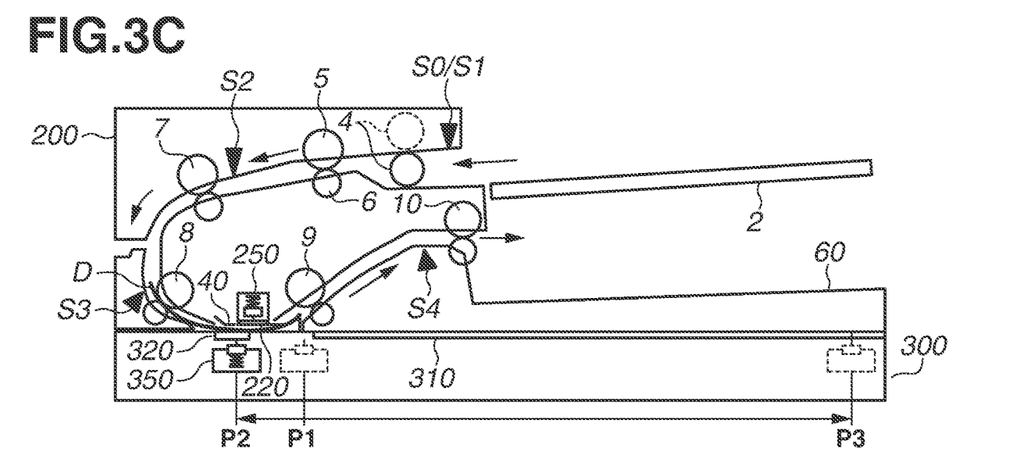

Meanwhile, although a narrow document, such as a business card, has a large grammage, due to its small size, the conveyance resistance received from the conveyance path is smaller than the conveyance resistance of longer paper sheet having the same grammage (see FIG. 3C). Therefore, the fluctuation of the document conveyance speed is small, unlike in the case of the above-mentioned longer paper, and the conveyance speed of a card-shaped document, such as a business card, generally matches the drive speed of the conveyance roller over an entire reading area of the document.

In view of the above-mentioned tendency of the fluctuation of the conveyance speed of the document, the image reading device according to a first exemplary embodiment can execute a plurality of conveyance control including the first conveyance control and the second conveyance control. In other words, in a case where a document having a wide document width (long paper or the like) is placed on the document tray 2 and conveyed, the first conveyance control is executed. On the other hand, in a case where a document having a narrow document width, such as a business card, is conveyed, the second conveyance control is executed.

In the first conveyance control, the drive speed of a plurality of conveyance roller pairs including at least the first conveyance roller pair 8 and the second conveyance roller pair 9 is made variable during reading. In a case where the document width of a placed document is wide, the document is assumed to be a long document having a long length in the conveyance direction of the document. In the present exemplary embodiment, in a case where a document that is not narrow has a document width of 105 mm or more, the conveyance speed of the document can be kept constant over the entire reading area by controlling the drive speed of the conveyance roller pair as illustrated in FIG. 4. As a result, regardless of the size of the document, the conveyance speed of the document in the reading area becomes substantially constant, and a read image having a uniform magnification in the conveyance direction can be obtained.

On the other hand, in the second conveyance control, the drive speed of the conveyance roller pair is kept constant during reading. In the second conveyance control, a placed document is assumed to have a narrow document width, that is, assumed to be a card-shaped document, such as a business card, having a short length in the widthwise direction of the document and in the conveyance direction of the document. In this case, as described above, the conveyance speed of the document substantially matches the drive speed of the conveyance roller pairs 8 and 9 over the entire reading area. Accordingly, as far as the drive speed is made to be constant, the conveyance speed of the document also becomes constant.

Figure 4:
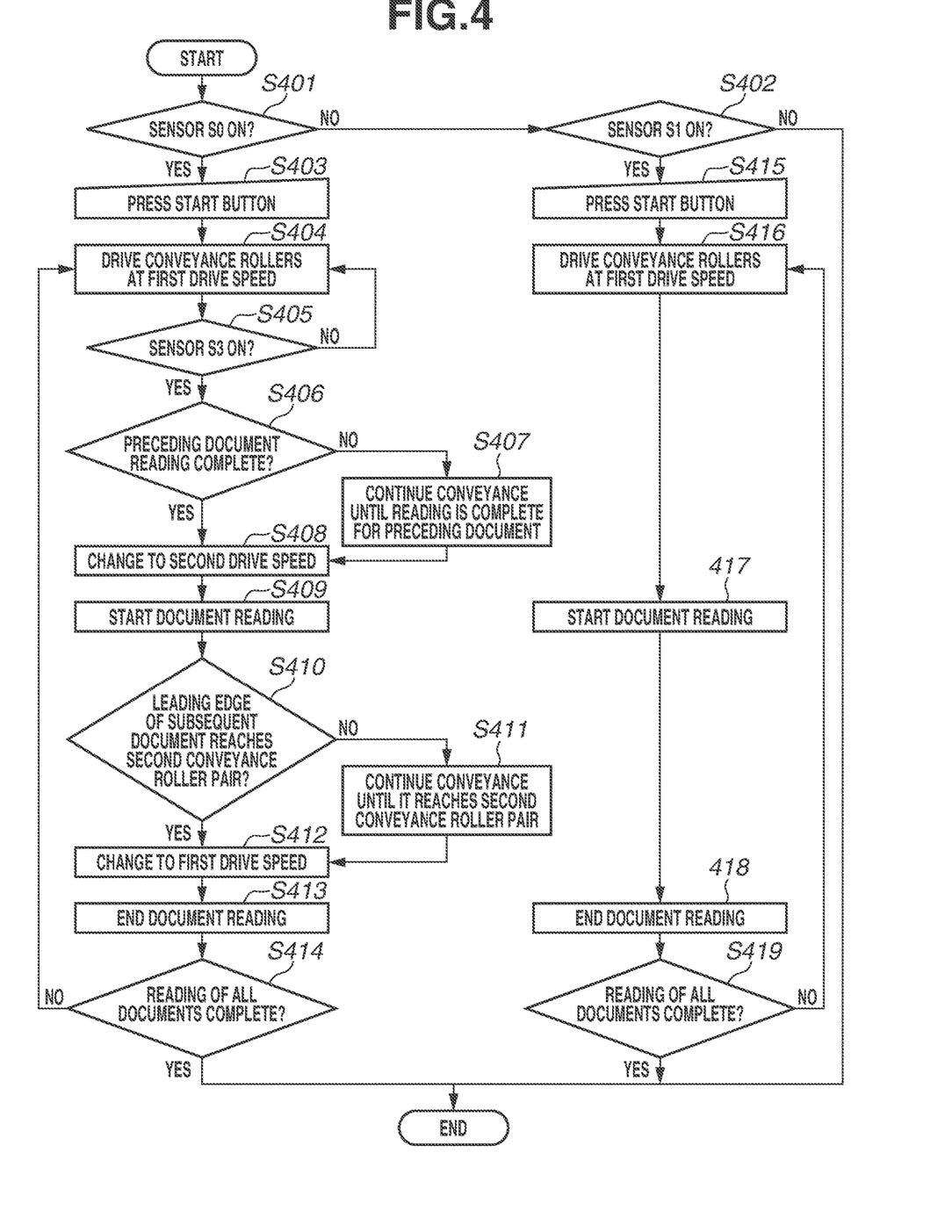
FIG. 4 is a flowchart illustrating a document conveyance operation.

FIG. 4 is a flowchart illustrating the document conveyance operation according to the present exemplary embodiment. The programs for executing each step illustrated in the flowchart of FIG. 4 are stored in the ROM of the control unit 1. The relevant programs are read into the RAM and executed by the CPU.

When a document is placed on the document tray 2, the control unit 1 determines a width of the document based on detection signals that are input from the document detection sensors S0 and S1. Specifically, in a case where both the document detection sensor S1 and the document detection sensor S0 detect the document, or in a case where only the document detection sensor S0 detects the document, the document is determined to be a document that is not narrow having a document width of 105 mm or more (YES in step S401). In a case where "YES" is determined in step S401, the processing proceeds to step S403. In step S403, the start button on the operation panel 410 is pressed. In step S404, the control unit 1 drives the conveyance motor M to set the drive speed of each conveyance roller (7, 8, 9, and 10) to a first drive speed equal to a reading speed, which is a specified value. Then, the control unit 1 waits until the document reaches the first leading sensor S3 on the conveyance path.

When the document reaches the first leading sensor S3 (YES in step S405), the process proceeds to step S406. In step S406, the control unit 1 determines whether an image reading operation for a preceding document is complete. In a case where the first document is conveyed, the determination is "YES", since there is no preceding document. On the other hand, in a case where the second and subsequent documents are conveyed (NO in step S406), in step S407, the drive speed of the conveyance roller is not changed and the first drive speed is maintained until the image reading operation of the preceding document is complete.

In step S408, the control unit 1 changes the drive speed of the conveyance roller pairs (7, 8, 9, and 10) from the first drive speed to 100.5% of the reading speed. Then in step S409, the document continues to be conveyed at this second drive speed. At a time when the document passes the first leading sensor S3 and moves a predetermined distance to the second conveyance roller pair 9 (YES in step S410), in step S412, the drive speed of the conveyance roller pairs (7, 8, 9, and 10) is returned to the first drive speed. In this way, it is possible to keep the document conveyance speed constant at a position where the document receives a large conveyance resistance.

When the reading of the conveyed document is completed in step S413, the detection results of the document detection sensors S1 and S0 are checked, and it is determined whether all the documents placed on the document tray 2 have been read. In a case where there is still a document remaining in the document tray, the processing returns to step S404 to convey the next document and the next document is conveyed at a drive speed equal to the reading speed (S414).

As described above, in the present exemplary embodiment, in a case where a document that is not narrow is conveyed, the first conveyance control is executed. Specifically, the drive speed of the conveyance roller is accelerated to 100.5% of the reading speed at a later time of either the arrival of the document to the first leading sensor S3 or the completion of the reading process of the preceding document. Thereafter, the drive speed is returned to the reading speed at a time when the leading edge of the document moves a predetermined distance from the first leading sensor S3 to the second conveyance roller pair 9. By executing conveyance control in this way, it is possible to keep the conveyance speed of the document constant by increasing the drive speed at a position where the long document receives a large conveyance resistance.

The second conveyance control, which is conveyance control for narrow documents, will be described. In step S401, in a case where the document detection sensor S0 does not detect a document (NO in step S401) and only the document detection sensor S1 detects the document (YES in step S402), the control unit 1 determines that the document placed on the document tray 2 is a narrow document. In step S415, the start button is pressed on the operation panel 410. In step S416, the control unit 1 drives the conveyance motor M to set the drive speed of each conveyance roller (7, 8, 9, and 10) to a first drive speed equal to the reading speed, which is a specified value.

In a case where a narrow document is conveyed by the second conveyance control, the drive speed of the conveyance roller pairs (7, 8, 9, and 10) is kept constant during the reading of the document. That is, the first drive speed is maintained (S417 and S418).

The narrow document is assumed to be a card-shaped document, such as a business card. Although a card-shaped document, such as a business card, generally has a large grammage, a document of this size has an exceptionally small conveyance resistance, due to the size of the document, particularly a short size in a direction orthogonal to the conveyance direction. Therefore, in control in which the drive speed of the conveyance roller is increased with respect to the document size and the grammage, such a narrow document may be unnecessarily accelerated and the magnification in the conveyance direction may be reduced.

In the first exemplary embodiment, when conveying a narrow document, the drive speed of the conveyance roller pair is maintained at a first speed, which is a constant speed, during the time period from the start of reading the document to the completion of reading thereof. In a second exemplary embodiment, even for a narrow document, in a case where the conveyance resistance of the document being conveyed fluctuates, the following conveyance control can be executed in the same manner as for a document that is not narrow. That is, the drive speed is accelerated to be faster than the reading speed at a later time of either the completion of reading of the document or the arrival of its subsequent document to the first leading sensor S3. Then, the control for returning the drive speed to the reading speed is executed at a time when the leading edge of the document passes the first leading sensor S3 and moves a predetermined distance to the second conveyance roller pair 9. However, in this case, an acceleration ratio for the narrow document is preferably set to be less than the acceleration ratio for a document that is not narrow.

In the present exemplary embodiments, a configuration has been described where two document detection sensors S1 and S0 arranged at different positions in the widthwise direction are used to discriminate between a narrow document and a document that is not narrow. However, for example, a sensor that detects the position of the side regulating plate 125A or 125B can be added to detect a width of a document based on a signal input from this sensor.

Further, in the present exemplary embodiments, an example has been described where the first conveyance control and the second conveyance control are selectively executed based on the width of the document (the length in the main scanning direction). However, not only the width of the document, but such information as the length of the document in the conveyance direction, the grammage, and the surface properties can be acquired so that the first conveyance control or the second conveyance control can be executed based on the information and the document width. The acceleration ratio of the drive speed of the conveyance roller pair in a case where the first conveyance speed is executed can be changed based on these pieces of information.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-018276, filed Feb. 5, 2020, which is hereby incorporated by reference herein in its entirety.

What is claimed is:

1. An image reading device comprising:
an original document tray on which an original document is to be placed;
a plurality of conveyance rollers configured to convey the original document in a conveyance direction;
an image reading unit configured to read an image of the conveyed original document at a reading position; and
a controller configured to selectively execute first conveyance control and second conveyance control based on a width of the original document, which is a length of the original document in a direction orthogonal to the conveyance direction,
wherein the plurality of conveyance rollers includes a first conveyance roller arranged upstream of the reading position in the conveyance direction, and a second conveyance roller arranged downstream of the reading position in the conveyance direction,
wherein, in the first conveyance control, the controller is configured to change a drive speed of the first and second conveyance rollers from a first speed to a second speed that is faster than the first speed after the original document reaches the first conveyance roller and before the original document passes through the reading position, and to change the drive speed of the first and second conveyance rollers from the second speed to the first speed after the original document reaches the second conveyance roller and before the reading of the image of the original document completes, and
wherein, in the second conveyance control, the controller maintains the drive speed of the first and second conveyance rollers in a section from a position where the original document reaches the first conveyance roller to a position where the reading of the image of the original document completes.

2. The image reading device according to claim 1, further comprising:
a first sensor configured to detect the original document placed on the original document tray; and
a second sensor configured to detect the original document at a position different from the first sensor in a widthwise direction orthogonal to the conveyance direction;
wherein the controller estimates the original document width based on detection signals output from the first and second sensors.

3. The image reading device according to claim 2, wherein, in a case where the original document is detected by both the first sensor and the second sensor, the controller executes the first conveyance control and, in a case where the original document is not detected by the second sensor but is detected by the first sensor, the controller executes the second conveyance control.

4. The image reading device according to claim 3, wherein the first sensor detects the original document at a center of the original document tray in the widthwise direction, and
wherein the second sensor detects the original document at an end portion side in the widthwise direction past the first sensor.

5. The image reading device according to claim 1 further comprising a separation roller configured to separate original documents placed on the original document tray one at a time,
wherein the separation roller is arranged upstream of the plurality of conveyance rollers in the conveyance direction.

6. The image reading device according to claim 1, wherein the plurality of conveyance rollers is driven by the same motor.

7. An image reading device comprising:
an original document tray on which an original document is to be placed;
a plurality of conveyance rollers configured to convey the original document in a conveyance direction;
an image reading unit configured to read an image of the conveyed original document at a reading position; and
a controller configured to selectively execute first conveyance control and second conveyance control based on a width of the original document, which is a length of the original document in a direction orthogonal to the conveyance direction,
wherein the plurality of conveyance rollers includes a first conveyance roller arranged upstream of the reading position in the conveyance direction, and a second conveyance roller arranged downstream of the reading position in the conveyance direction,
wherein, in the first conveyance control, the controller is configured to change a drive speed of the first and second conveyance rollers from a first speed to a second speed that is faster than the first speed after the original document reaches the first conveyance roller and before the original document passes through the reading position, and to change the drive speed of the first and second conveyance rollers from the second speed to the first speed after the original document reaches the second conveyance roller and before the reading of the image of the original document completes, and wherein, in the second conveyance control, the controller is configured to change the drive speed of the first and second conveyance rollers from the first speed to a third speed, faster than the first speed and slower than the second speed, after the original document reaches the first conveyance roller and before the original document passes through the reading position, and to change the drive speed of the first and second conveyance rollers from the third speed to the first speed after the original document reaches the second conveyance roller and before the reading of the image of the original document completes.

\* \* \* \* \*